United States Patent [19]

Ogoe et al.

[11] Patent Number: 5,276,078
[45] Date of Patent: Jan. 4, 1994

[54] IGNITION RESISTANT POLYCARBONATE BLENDS

[75] Inventors: Samuel A. Ogoe, Missouri City; Thoi H. Ho, Lake Jackson, both of Tex.; Robert W. Ranger, Midland, Mich.

[73] Assignee: The Dow Chemical Company, Midland, Mich.

[21] Appl. No.: 821,341

[22] Filed: Jan. 13, 1992

Related U.S. Application Data

[63] Continuation of Ser. No. 383,947, Jul. 24, 1989, abandoned.

[51] Int. Cl.$^5$ ............ C08K 5/521; C08K 5/524; C08L 69/00
[52] U.S. Cl. .................. 524/141; 524/145; 524/153; 524/154; 525/84; 525/146
[58] Field of Search ........... 524/145, 153, 154, 141, 524/281; 525/146, 84

[56] References Cited

U.S. PATENT DOCUMENTS

| | | | |
|---|---|---|---|
| 4,481,338 | 11/1984 | Serini et al. | 525/394 |
| 4,632,953 | 12/1986 | Dozzi | 524/281 |
| 4,751,260 | 6/1988 | Kress et al. | 525/146 |
| 4,766,165 | 8/1988 | Kress et al. | 525/146 |
| 4,810,739 | 3/1989 | Lindner | 524/371 |
| 4,883,835 | 11/1989 | Buysch et al. | 524/141 |
| 4,927,870 | 5/1990 | Ogoe | 524/141 |

FOREIGN PATENT DOCUMENTS 3521388 12/1986 Fed. Rep. of Germany ...... 525/146

OTHER PUBLICATIONS

DE 2918883, Derwent Abstract #80-84583c/48.

*Primary Examiner*—John C. Bleutge
*Assistant Examiner*—D. R. Wilson

[57] ABSTRACT

Improved thermoplastic resinous blends are disclosed comprising a carbonate polymer; an organophosphorus compound; a fluorinated polymer; and a halogenated diphenol oligocarbonate.

15 Claims, No Drawings

IGNITION RESISTANT POLYCARBONATE BLENDS

CROSS-REFERENCE TO RELATED APPLICATION

This is a continuation of application Ser. No. 383,947, filed Jul. 24, 1989, now abandoned.

This invention relates to modified carbonate polymer compositions containing polytetrafluoroethylene, an organophosphate and a halogenated bisphenol oligocarbonate with and without other additives. The presence of the oligomeric halogenated bisphenol carbonate results in improved surface properties and impact resistance of the resulting resin blend.

Blends of polycarbonates and various additives have found extensive commercial application because of their excellent physical properties. These thermoplastic polymer blends are suitable for the manufacture of molded parts wherein impact strength, rigidity, toughness, heat resistance, and excellent electrical properties are required.

Unfortunately, however, these polymer blends often exhibit a brief but definite burning time when contacted with an open flame.

In attempts to increase the combustion resistance of such thermoplastic polymer blend, it has been previously known in the al-t to incorporate polytetrafluoroethylene and organophosphorus compounds. In U.S. Pat. Nos. 4,692,488 and 4,751,260 halogen-free polycarbonates and halogen containing polycarbonates are blended with styrene/acrylonitrile copolymers, phosphoric acid esters, polytetrafluoroethylene and rubbery graft copolymers. The styrene/acrylonitrile copolymer is desired in order to adequately disperse the polytetrafluoroethylene for good surface properties in the resulting molded parts. Despite the use of such styrene/acrylonitrile copolymers, it has been found difficult in practice to obtain adequate dispersion of the polytetrafluoroethylene in order to avoid loss of physical properties in the resulting molded objects. In particular, inadequate dispersion can result in reduced impact resistance, brittle failure and streaking of the objects surface. U.S. Pat. No. 4,481,338 discloses blends of polyphosphates, polycarbonates and polytetrafluoroethylene which may in addition include organic chlorine or bromine compounds. At col. 12, lines 12-14 chlorinated and brominated diphenol oligocarbonate are listed as suitable chlorine and bromine compounds however no examples embodying such compounds were provided.

SUMMARY OF THE INVENTION

According to the present invention it has now been discovered that improved thermoplastic resinous blends are prepared comprising:
a) a carbonate polymer;
b) an organophosphorus compound
c) a fluorinated polymer of the fibril forming type; and
d) a halogenated diphenol oligocarbonate.

Additionally the resin blend may comprise a rubber modified vinylaromatic/(meth)acrylonitrile copolymer and/or a rubbery graft copolymer.

Surprisingly, the halogenated diphenol oligocarbonate has been found to improve the dispersion of the fluoropolymer resulting in improved surface properties and impact resistance without the addition of large amounts of styrene/acrylonitrile copolymer as taught in U.S. Pat. No. 4,692,488. Other halogenated compounds know for use in improving fire resistance such as those disclosed in the foregoing U.S. Pat. No. 4,481,338 do not appear capable of imparting the desired dispersing effect. Thus, the compositions of this invention have an unique advantage over the prior art.

The ignition resistant thermoplastic resin blends of the present invention exhibit surprisingly high resistance to combustion and/or ignition and are suitably employed in most applications in which similar blends have been previously utilized. Applications of particular interest for the utilization of the compositions of this invention are pigmented or unpigmented moldings useful as automobile parts, e.g., air filters, fan housings, exterior components, housings for electrical motors, appliances, business and office equipment, photographic equipment, and aircraft applications.

DETAILED DESCRIPTION OF THE INVENTION

The carbonate polymers employed in the present invention include the trityl diol carbonates described in U.S. Pat. Nos. 3,036,036; 3,036,037; 3,036,038 and 3,036,039; polycarbonates of bis(ar-hydroxy-phenyl)alkylidenes (often called bisphenol-A type diols), including their aromatically and aliphatically substituted derivatives such as disclosed in U.S. Pat. Nos. 2,999,835; 3,038,365; 3,334,154, and 4,299,928; and carbonate polymers derived from other aromatic diols such as described in U.S. Pat. No. 3,169,121.

It is understood, of course, that the carbonate polymer may be derived from (1) two or more different dihydric phenols or (2) one or more dihydric phenols and one or more hydroxy- or acid-terminated reactants such as dicarboxylic acids, or alkylene glycols in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known; for example, several suitable methods are disclosed in the aforementioned patents which are hereby incorporated by reference in their entirety.

As previously mentioned, the compositions of this invention employ an organophosphorus compound to aid in preventing polymer degradation under molding conditions and increasing the ignition resistance. Suitable organophosphorous compounds are those which include the organophosphates, the organophosphonites, the organophosphines, the organophosphites and the polyphosphates. Preferred organophosphorous compounds are those represented by the formulae:

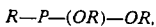

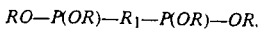

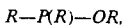

$P(R)_3$, $P(OR)_3$

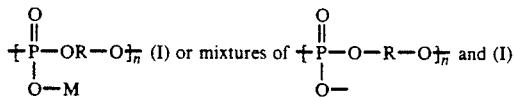

wherein R is independently an unsubstituted or substituted aryl, alkyl, cycloalkyl, aralkyl, or alkaryl radical containing one or more carbon atoms, $R_1$ is a 4,4'biphenyl radical, M is H, R or R—OH, and n is an integer from 1 to 1000. The preferred organophosphorous compound is triphenylphosphate. Suitable organophosphorus compositions are disclosed in U.S. Pat. Nos. 4,066,611; 4,073,769; 4,076,686; 4,088,709; 4,427,813; and 4,254,014. The teachings of these patents are incorporated herein by reference.

Suitable fluorinated polymers for use in this invention are those adapted to form a fibril structure to stabilize the polymer under molten conditions. Preferred are polytetrafluoroethylene polymers. Such polymers are generally disclosed by U.S. Pat. Nos. 3,005,795; 3,671,487 and 4,463,130. The teachings of these patents are incorporated herein by reference. Most desirably the polytetrafluoroethylene (PTFE) polymers have a high elastic memory such that when incorporated into the polymeric blend and molded into a molded object such molded object will have a heat shrinkage equal to or greater than 15 percent when tested under the following conditions. A polycarbonate resin with 0.5% of PTFE is injection molded into bars having the dimensions of $5'\times\frac{1}{2}''\times 1/16''$ (127 mm×27 mm×1.6 mm) and heated at 160° C. for 1 hour. The length of the part is then measured and compared to the length of the sample before heating. A 75 ton Newbury molding machine is used. The molding conditions are:

Barrel Temperature: 250° C.
Mold Temperature: 65° C.
Screw Speed: 150 rpm
Pressure 1000 psi The results of several tests are shown in Table I.

TABLE I

Relationship Between the Shrinkage and UL-94 for Different Polytetrafluoroethylenes (PTFE)

| Run | PTFE* | Shrinkage | UL-94 at 1/16" |
|---|---|---|---|
| 1 | 8 | 1 | V-2 |
| 2 | DXL-6000 | 1 | V-2 |
| 3 | 6C | 25 | V-0 |
| 4 | 70 | 25 | V-0 |
| 5** | 6C | 8 | V-2 |
| 6** | 60 | 6 | V-2 |
| 7 | 64 | 15 | V-0 |
| 8 | 6CN | 24 | V-0 |
| 9 | 65 | 22 | V-0 |
| 10 | 67 | 22 | V-0 |

*Various grades of Teflon TM from Du Pont
**Molding temperature 325° C.

Additionally the molded part is preferably prepared under molding conditions especially temperature conditions, such that the elastic memory of the fluorinated polymer is preserved. This result is indicated by the retention of a UL-94 rating for 1/16" parts of V—O.

Table I shows that only high elastic memory PTFE is effective as an ignition resistant (IR) additive. The high elastic memory PTFE helps the polycarbonate sample contract upon exposure to 1 flame source and thus imparts ignition resistance to the polycarbonate. The relationship between the percent shrinkage and the UL-94 test is also shown in Table I. The PTFE that gives a polycarbonate shrinkage greater than 15 percent is effective as an IR additive. Some examples of PTFE that have high elastic memory such as Teflon TM 6C, 60, 64, 6CN, 65 and 67 are shown in Table I. The PTFE that have a low percent of shrinkage such as Teflon TM DXL-6000 and Teflon TM 8 did not impart ignition resistance to the polycarbonate. Note, that if the molding temperature is too high, especially if it is higher than the melting point of PTFE the elastic memory of FTFE is significantly reduced.

The carbonate polymer compositions of the present invention are suitably prepared by combining the ingredients in effective amounts using any of a variety of blending procedures conventionally employed for polymer blends. For example, dry particulates of the carbonate polymer, and the other additives can be dry blended and the resulting dry blend extruded into the desired shape. As previously mentioned it is desirable to blend the fluorinated polymer and the halogenated diphenol oligocarbonate and to add this product to the remaining components, or at least to the remaining polymeric components. Also, the melt temperature is desirably limited to temperatures less than 325° C., preferably less than 275° C.

The amount of the fluorinated polymer is preferably in the range from 0.001 to 30 percent and most preferably in the range from 0.02 to 10 percent by weight based on total composition weight.

The halogenated diphenol oligocarbonate are items of commerce and well known in the art. A preferred halogenated oligocarbonate is 2,2-bis(3,5-dibromo-4-hydroxyphenyl)propane oligocarbonate and is commercially available under the tradename BC-52 or BC-58 from Great Lakes Chemicals. In a preferred embodiment the halogenated oligocarbonate is first blended with the fluorinated polymer and the resulting predispersed product blended with remaining ingredients. In this manner it is easier to retain the elastic nature of the fluorinated polymer and the ultimate improved properties of the resin.

The rubber modified vinylaromatic/(meth)acrylonitrile copolymers additionally suitably employed according to the present invention preferably include butadiene rubber modified copolymers of vinyl aromatic monomers, especially styrene and acrylonitrile optionally further containing maleic anhydride, alkyl methacrylate, N-substituted maleimide or other polymerizable comonomers. Such copolymers are herein collectively referred to as ABS resins. Preferred ABS resins are those prepared by the solution or bulk polymerization of styrene and acrylonitrile comonomers in the presence of dissolved polybutadiene rubber. Alternatively such ABS resins may be prepared by mixing together previously prepared matrices comprising the vinyl monomer, (meth)acrylonitrile, optional comonomer(s) and rubbery graft copolymers such as styrene/acrylonitrile grafted -polybutadiene or -styrene/butadiene copolymer rubber lattices. In addition to polybutadiene or styrene/butadiene copolymers other suitable rubbers include the well known copolymers of ethylene and propylene optionally containing copolymerizable conjugated dienes (known as EPDM rubbers), polyacrylates such as polybutylacrylate and mixtures of the foregoing rubbers.

Suitable rubbery graft copolymers which may be incorporated into the resin blend of the present invention particularly include the grafted acrylate rubbers particularly those having a core-shell structure and copolymers of styrene and methylmethacrylate grafted to butadiene rubbers known in the art as MBS graft copolymers.

The amount of rubber modified vinyl-aromatic/(meth)acrylonitrile copolymer incorporated into the blend of the present invention may range from about 5 percent to about 95 percent by weight preferably from about 7 percent to about 50 percent by weight based on total composition weight. The rubbery graft copolymer is preferably utilized in an amount from about 0.01 to 50 percent by weight preferably from 0.1 to 25 percent by weight based on total composition weight. The organophosphorus compound is suitably employed in an amount from 0.001 to 50 percent by weight, most preferably from 0.01 to 10 percent by weight based on total composition weight. Finally the halogenated diphenol oligocarbonate is preferably employed in a range from 0.001 to 50 percent by weight, most preferably from 0.01 to 30 percent by weight based on total composition weight.

Additional additives and adjuvants may be included in the composition of the present invention in order to provide desirable improved properties. In particular an inorganic salt may be included in an amount from 0.001 to 10 percent by weight, most preferably from 0.001 to 5 percent by weight in order to impart additional resistance to ignition. A preferred inorganic salt is a metal sulfate, particularly an alkaline metal sulfate such as sodium sulfate.

In addition, other additives can be included in the modified carbonate polymer composition of the present invention such as fillers (i.e., glass fibers), pigments, dyes, antioxidants, heat stabilizers, ultraviolet light absorbers, mold release agents and other additives commonly employed in carbonate polymer compositions.

The following examples are given to further illustrate the invention and should not be construed as limiting its scope. In the following examples, all parts and percentages are by weight unless otherwise indicated.

The melt flow rate of the polycarbonate resins were measured according to ASTM D-1238, condition zero.

EXAMPLE 1

An ignition resistant blend of polycarbonate and an ABS resin is prepared by adding 0.5 parts polytetrafluoroethylene (Teflon TM 6C available from Du Pont Chemical Company) to 5 parts 2,2-bis(3,5-dibromo-4-hydroxyphenyl)propane oligocarbonate having an average polycondensation degree of from 2 to 20 (BC-52 available from Great Lakes Chemical Company). The two ingredients are preblended by uniformly dispersing the same in a blender. Ten parts triphenyl phosphate flakes are then added. The resulting mixture is further combined to 64.4 parts heat stabilized polycarbonate resin having a melt flow of 22 (Calibre 300 available from The Dow Chemical Company), 16.1 parts of a rubber modified styrene acrylonitrile resin (ABS 213 available from The Dow Chemical Company) and 4 parts of a styrene methylmethacrylate grafted butadiene rubber (Paraloide TM 3607 available from Rohm & Haas). The mixture was dry blended for one minute then extruded into pellets using a twin screw extruder at 230° C. barrel temperature. The extruded pellets are dried in an air draft of 100° C. for 4 hours. The resulting extruded dried pellets are injection molded into test bars for testing of ignition resistance and impact properties.

EXAMPLE 2

The procedure of Example 1 is repeated excepting that 0.05 parts sodium sulfate is added to the final resin blend prior to dry blending, extrusion and pelleting.

CONTROL

The procedure for Example 1 is repeated excepting that no halogenated diphenol oligocarbonate (BC-52) is employed.

All of the above compositions when tested according to UL-94 gave V—O rating at 1/16 inch. Impact strength, brittleness and surface appearance differed markedly however. Results are contained in Table I.

TABLE I

| Example | Impact Strength[a] | % Brittle[b] | Appearance |
|---|---|---|---|
| 1 | 11.0 | 0 | Smooth |
| 2 | 11.0 | 0 | Smooth |
| Control | 4.0 | 100 | Streaks |

[a]Izod Impact 40° F. ft lb/in.
[b]% samples failing by brittle instead of ductile failure.

The above results indicate that the presence of a halogenated diphenol oligocarbonate in the above resin blend imparts surprisingly improved polymer properties particularly improved impact strength and appearance despite the presence of polytetrafluoroethylene particles therein.

What is claimed is:

1. A thermoplastic resinous blend prepared by the process of combining a) a carbonate polymer; b) an organophosphorous compound; c) a fibril forming fluorinated polymer in the form of a powder; d) a halogenated diphenol oligocarbonate; e) a rubber modified vinyl aromatic/(meth)acrylonitrile copolymer; and f) optionally a rubber graft copolymer, and melt blending wherein c) is incorporated by dry blending in combination with d) prior to melt blending.

2. A thermoplastic resinous blend according to claim 1 wherein the carbonate polymer is a bisphenol A homopolycarbonate.

3. A thermoplastic resinous blend according to claim 1 wherein the organophosphorus compound is a phosphorus acid ester.

4. A blend according to claim 1 wherein the organophosphorous compound is triphenyl phosphate.

5. A blend according to claim 1 wherein the fluorinated polymer is polytetrafluoroethylene.

6. A blend according to claim 1 wherein the halogenated diphenol oligocarbonate is 2,2-bis-(3,5-dibromo-4-hydroxyphenyl)propane oligocarbonate.

7. A blend according to claim 1 wherein the rubber modified vinylaromatic/(meth)acrylonitrile copolymer is an ABS resin.

8. A blend according to claim 1 additionally comprising a rubber graft copolymer.

9. A blend according to claim 8 wherein the rubber raft copolymer is a styrene/methylmethacrylate grafted butadiene rubber.

10. A blend according to claim 1 additionally comprising an inorganic salt.

11. A blend according to claims 1, 6 or 7 prepared by melt blending the components at a temperature less than 325° C.

12. A blend according to claim 10 wherein the blend is melt blended at a temperature less than 275° C.

13. A molded object having improved resistance to ignition prepared by molding a resin according to claims 1, 6, or 7 at a temperature less than 325° C.

14. A blend according to claim 1 prepared by preparing a first blend comprising the halogenated diphenol oligocarbonate and the fluorinated polymer and subsequently preparing a second blend comprising the first blend and the carbonate polymer, the rubber modified vinyl aromatic/(meth)acrylonitrile polymer and the organophosphorus compound.

15. A blend according to claim 8 prepared by preparing a first blend comprising the halogenated diphenol oligocarbonate and the fluorinated polymer and subsequently preparing a second blend comprising the first blend and the carbonate polymer, the rubber modified vinyl aromatic/(meth)acrylonitrile polymer and the organophosphorus compound.

* * * * *